United States Patent
Peng et al.

(10) Patent No.: US 6,785,063 B2
(45) Date of Patent: Aug. 31, 2004

(54) OBJECTIVE LENS HOLDING APPARATUS

(75) Inventors: Li-Chung Peng, Hsinchu (TW); Chi-Ling Chang, Hsinchu (TW)

(73) Assignee: Acute Applied Technologies, Inc. (TW)

( * ) Notice: Subject to any disclaimer, the term of this patent is extended or adjusted under 35 U.S.C. 154(b) by 0 days.

(21) Appl. No.: 10/209,880

(22) Filed: Aug. 2, 2002

(65) Prior Publication Data

US 2004/0021960 A1 Feb. 5, 2004

(51) Int. Cl.[7] .............................. G02B 7/02; G11B 7/00
(52) U.S. Cl. ...................... 359/811; 359/813; 359/814; 359/822; 359/824; 369/44.15; 369/44.22
(58) Field of Search ................................ 359/811, 819, 359/820, 813, 822–824, 814; 396/526; 362/455; 353/100; 369/44.15, 44.22

(56) References Cited

U.S. PATENT DOCUMENTS

| | | | |
|---|---|---|---|
| 4,592,037 A | * 5/1986 | Ohnuki | 369/44.15 |
| 5,381,273 A | 1/1995 | Goda | 359/827 |
| 5,453,881 A | 9/1995 | Suzuki | 359/824 |
| 5,555,623 A | 9/1996 | Goda | 29/896.9 |
| 5,587,845 A | 12/1996 | Goda | 359/819 |
| 5,768,037 A | * 6/1998 | Marino et al. | 359/824 |
| 5,892,628 A | 4/1999 | Ikari | 359/813 |
| 6,480,460 B1 | * 11/2002 | Ohkuma et al. | 369/246 |
| 6,574,052 B2 | * 6/2003 | Suh | 359/814 |

* cited by examiner

Primary Examiner—Hung Xuan Dung
Assistant Examiner—Joseph Martinez
(74) Attorney, Agent, or Firm—Lowe Hauptman Gilman & Berner, LLP

(57) ABSTRACT

An objective lens holding apparatus includes an upper supporting portion and a bottom supporting portion not parallel with each other. The upper supporting portion and the bottom supporting portion have respectively one end connecting to an objective lens holder and another end connecting to a supporting arm anchor dock. The objective lens is mounted to the objective lens holder and is prevented from incurring an inclined angle while the objective lens is yawing. The elastic supporting arm anchor dock can keep the high resonant frequency within a desired range to enhance the stability of the optical pick-up head during reading and writing operations.

2 Claims, 3 Drawing Sheets

OBJECTIVE LENS HOLDING APPARATUS

FIELD OF THE INVENTION

The invention relates to an objective lens holding apparatus and particularly to an objective lens holding apparatus adopted for use on optical pick-up heads of optical reading devices (such as CD-ROM, DVD-ROM and the like) to ensure that the objective lenses move stability in the tracking and focusing direction to accomplish tracking and focusing servo operations.

BACKGROUND OF THE INVENTION

Using laser beams (such as semiconductor lasers) to pick up records on optical media (such as CDs or DVDs) is a technique known in the art. The laser beam is focused on the track located on the surface of the optical disk by means of an objective lens in the optical pick-up head. A photo detector converts the return light reflected from the optical disk into regenerated signals to obtain the data recorded on the optical disk. During data pick-up processes, tracking signals and focusing signals must be obtained from the return lights, and based on these signals the tracking actuator and the focusing actuator may be controlled to move the objective lens and ensure that the laser beam focuses correctly on the desired track on the surface of the optical disk.

In order to accomplish the servo operations of tracking and focusing, the objective lens must be able to move freely in the optical axis direction (i.e. the focusing direction) and the radial direction of the optical disk (i.e. the tracking direction). Hence a special holding apparatus for supporting the objective lens is required to provide stability movement. The known holding apparatus for supporting the objective lens can be classified as follows:

1. Wire-supporting type: U.S. Pat. Nos. 5,381,273, 5,555,623 and 5,587,845 disclose this type of technique in which the objective lens is supported by four elastic metallic wires (such as stainless steel wires). The metallic wires are parallel to one another. One end of the wires is fixed while the other end of the wires connects to a lens holder. The objective lens holder and the objective lens may be moved in two different directions under the driving of a tracking actuator and a focusing actuator to accomplish the servo operations. However, such a design tends to produce twisting on the metallic wires during the servo operations of tracking and focusing. As a result, tracking and focusing operations are prone to error.
2. Objective lens holder employing leaf spring: U.S. Pat. No. 5,892,628 discloses such a technique. It utilizes four parallel leaf springs to support the objective lens. U.S. Pat. No. 5,453,881 also discloses a technique that uses two parallel springs, an upper leaf spring and lower leaf spring, to support the objective lens. Both of these techniques are difficult to produce and assemble.
3. Axial sliding and rotating type device: U.S. Pat. No. 5,587,845 discloses such a technique. In the FIG. 1 of this patent, the objective lens holding device includes a supporting shaft for holding an objective lens holder and an objective lens. The objective lens holder and the objective lens may slide axially along the supporting shaft under the driving of the tracking actuator and the focusing actuator, or swing about the axis of the supporting shaft to accomplish the servo operations of tracking and focusing. However such a design requires precise matching dimensions for the objective lens holder and the supporting shaft. Thus it increases manufacturing difficulty. Furthermore, in the event that the supporting shaft and objective lens holder do not match properly, the objective lens holder tends to wobble.

In addition, employing the objective lens holders set forth above, the objective lens incurs variations of an inclined angle on the tangent line of the track while the pick-up head reads the optical disk. As a result, reading effectiveness is adversely impacted. Therefore, there is a need to develop an improved objective lens holder to remedy the disadvantage of variation of the inclined angle and to increase reading effectiveness.

SUMMARY OF THE INVENTION

The primary object of the invention is to provide an objective lens holding apparatus to prevent the objective lens from incurring an inclined angle during yawing when the optical pick-up head reads/writes the optical disk, and to keep the high resonant frequency within a desired range to enhance the stability of the optical pick-up head during reading and writing operations.

The objective lens holding apparatus of the invention is for supporting the objective lens of the optical system in an optical pick-up head. The apparatus includes an objective lens holder, a supporting arm anchor dock, an upper supporting portion and a bottom supporting portion. The objective lens holder is used to support the objective lens. The supporting arm anchor dock is elastic and remains stationary relative to the optical axis of the objective lens. The upper supporting portion and the bottom supporting portion correspond to each other and are elastic. One end of the supporting portions connects to the objective lens holder and the other end connects to the supporting arm anchor dock. The two supporting portions may be extended to cross with each other at a location beyond the supporting arm anchor dock.

As the non-parallel and elastic supporting portions form an inclined angle with the supporting arm anchor dock in opposite directions, during the reading operation on the optical disk the inclined angles offset each other. As a result, the objective lens is prevented from incurring an inclined angle during yawing when the optical pick-up head reads the optical disk. Moreover, the elastic supporting arm anchor dock can dampen the high resonant frequency to enhance the stability of the optical pick-up head during read/write operations.

The foregoing, as well as additional objects, features and advantages of the invention will be more readily apparent from the following detailed description, which proceeds with reference to the accompanying drawings.

DESCRIPTION OF THE PREFERRED EMBODIMENT

Figure 1A:
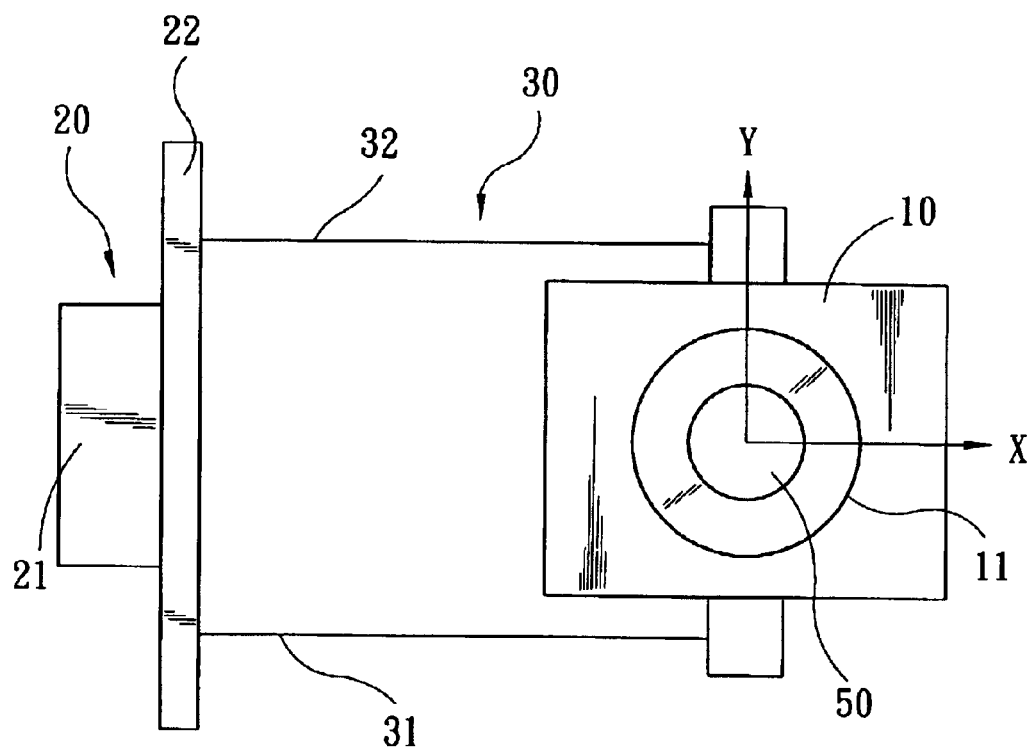
FIG. 1A is a top view of the invention.
Figure 1B:
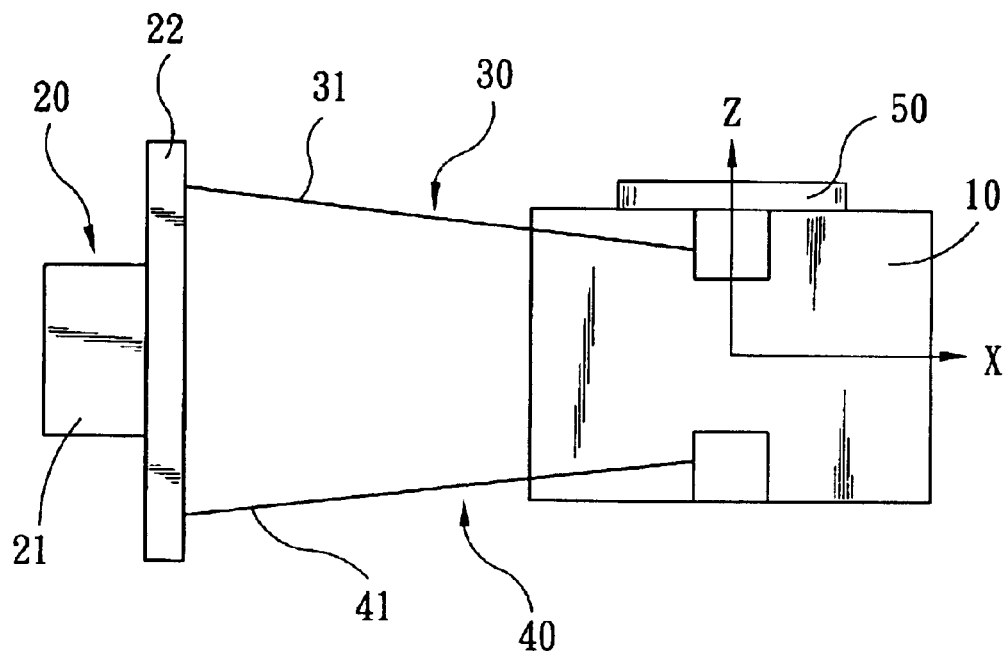
FIG. 1B is a side view of the invention.
Figure 2:
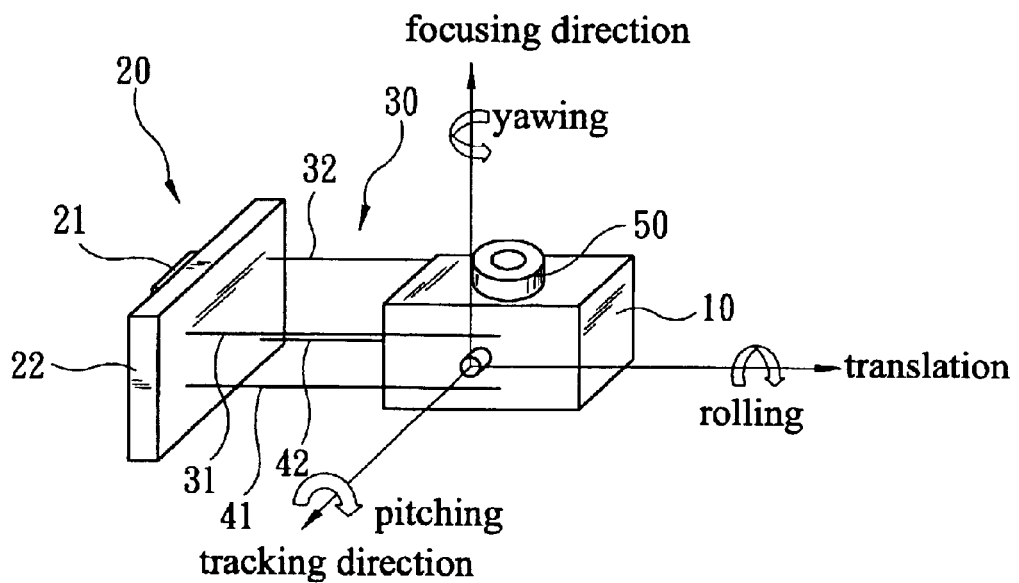
FIG. 2 is a schematic view of the objective lens holding apparatus of the invention in six degrees of freedom.

Referring to FIGS. 1A, 1B and 2, the objective lens holding apparatus of the invention aims at holding an objective lens 50 in the optical system of an optical pick-up head. The apparatus includes an objective lens holder 10, a supporting arm anchor dock 20, an upper supporting portion 30 and a bottom supporting portion 40.

The objective lens holder 10 has an access hole 11 to hold the objective lens 50, which can focus laser beams on the data recording surface of an optical disk. The objective lens holder 10 and the objective lens 50 may be moved in the tracking direction (TD), which is the radial direction of the optical disk, and in the focusing direction (FD), which is the optical axis direction of the laser beams or of the objective lens 50.

The supporting arm anchor dock 20 is elastic and remains stationary relative to the optical axis of the objective lens. The supporting arm anchor dock 20 has a base seat 21 and an elastic element 22, which is a thin plate located on one side of the base seat 21.

The upper supporting portion 30 and the bottom supporting portion 40 correspond to each other and are elastic. One end of the supporting portions connects to the objective lens holder 10 and the other end connects to the supporting arm anchor dock 20. The two supporting portions 30 and 40 may be extended to cross with each other at a location beyond the supporting arm anchor dock 20.

The upper supporting portion 30 includes a first supporting arm 31 and a second supporting arm 32 that are parallel with each other. The first and the second supporting arm 31 and 32 have one end connecting to the objective lens holder 10 and the other end connecting to the elastic element 22 of the supporting arm anchor dock 20. The bottom supporting portion 40 has a third supporting arm 41 and a fourth supporting arm 42 parallel with each other. The third and the fourth supporting arm 41 and 42 also have one end connecting to the objective lens holder 10 and the other end connecting to the elastic element 22 of the supporting arm anchor dock 20. The first supporting arm 31 corresponds to the third supporting arm 41, and the second supporting arm 32 corresponds to the fourth supporting arm 42. Each pair of the corresponding supporting arms may be extended to cross with each other at a location beyond the supporting arm anchor dock 20. For instance, the first supporting arm 31 may cross with the third supporting arm 41 after extension, and the second supporting arm 32 may cross with the fourth supporting arm 42 after extension.

Figure 3:
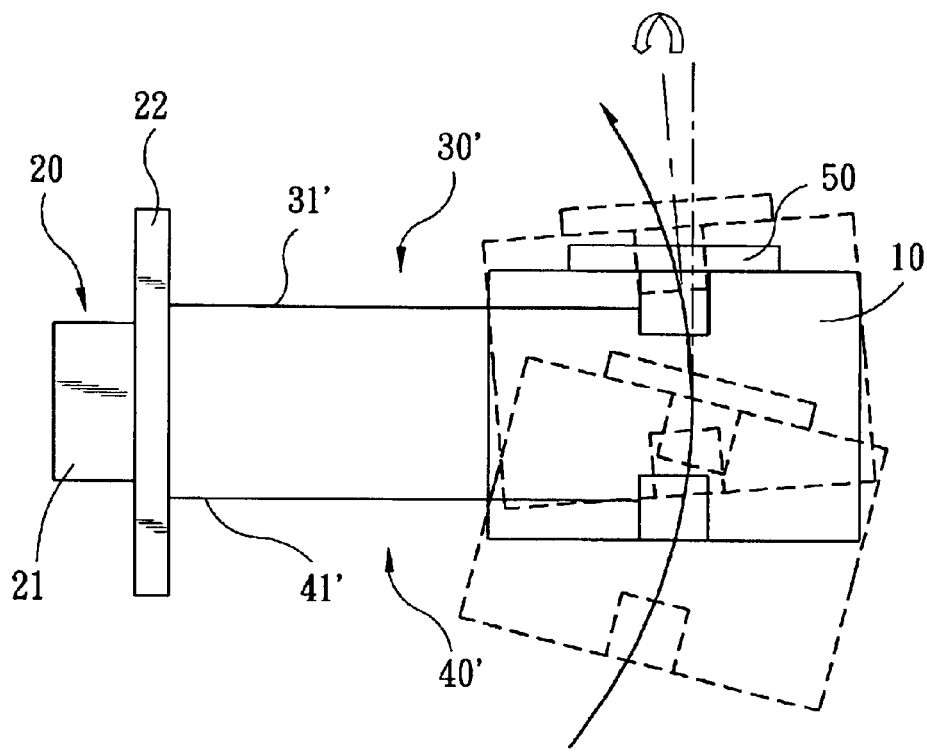
FIG. 3 is a schematic view of an optical pick-up head while reading an optical disk, with two parallel upper and bottom supporting portions incurring an inclined angle for the objective lens during yawing.

Referring to FIG. 3, in the event that two supporting arms 30' and 40' are parallel, when the optical pick-up head reads the optical disk, the objective lens 50 moves with the up and down movement of the optical disk. The supporting arm anchor dock 20 provides a push and pull force in the direction of the upper and the bottom supporting arm 30' and 40'. As a result, a pitching motion is incurred to cause the objective lens to generate an inclined angle during yawing. As the supporting arm anchor dock 20 is elastic, the supporting arm anchor dock 20 can dampen the high resonant frequency.

Figure 4:
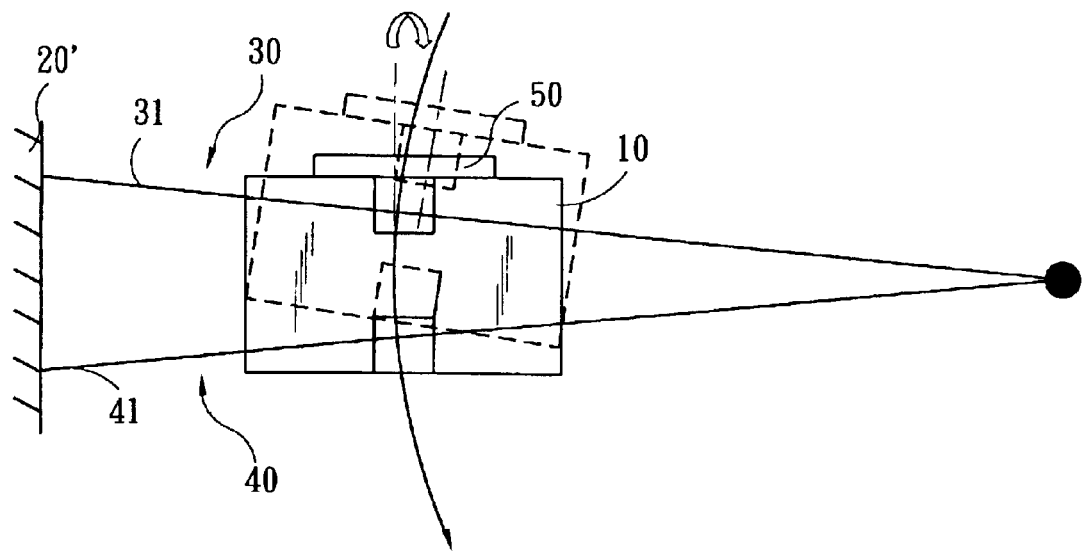
FIG. 4 is a schematic view of an optical pick-up head while reading an optical disk, with the non-elastic supporting arm anchor dock incurring an inclined angle for the objective lens during yawing.

Referring to FIG. 4, in the event that the supporting arm anchor dock 20' is not elastic, when the optical pick-up head reads the optical disk, the objective lens 50 moves with the up and down motion of the disk, and the objective lens generates an inclined angle during yawing.

Figure 5:
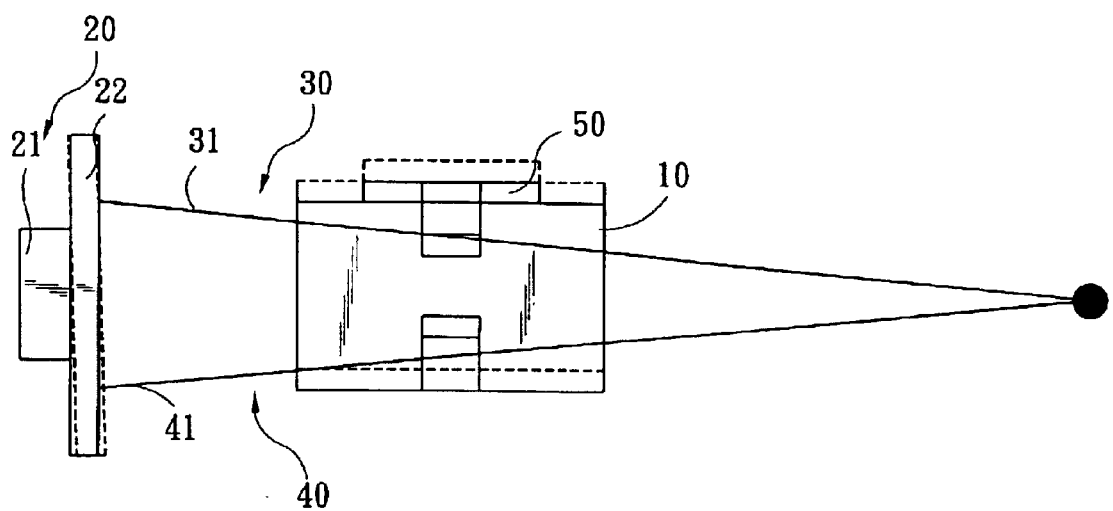
FIG. 5 is a schematic view of an optical pick-up head of the invention while reading an optical disk, with non-parallel upper and bottom supporting portions and the elastic supporting arm anchor dock, resulting in no inclined angle for the objective lens during yawing.

Referring to FIG. 5, as the two supporting arms 30 and 40 of the invention are not parallel with each other, and the supporting arm anchor dock 20 is elastic, the two opposite inclined angles offset each other while the objective lens is yawing. As a result, the objective lens does not incur an inclined angle. Moreover, the upper and the bottom supporting portions 30 and 40, and the supporting arm anchor dock 20, can reduce the inclined angle that might incur on the objective lens 50 at a low frequency motion. The supporting arm anchor dock 20 can also keep the high resonant frequency.

Thus, when the objective lens 50 focuses at a low frequency, the objective lens holding apparatus of the optical pick-up head maintains the vibration mode in the focusing direction and enables the optical pick-up head to move only in the FD when operating at a low frequency. Meanwhile, the rigidity in the rolling direction of the objective lens suspending apparatus may also increase. When the objective lens 50 focuses at a high frequency, the objective lens holding apparatus of the optical pick-up head can reduce the high resonant frequency and prevent resonance on other elements. Thus damping becomes fully effective to prevent harmful resonance from occurring in the high frequency zone.

By means of the objective lens holding apparatus set forth above, the following results can be accomplished:

1. The invention provides non-parallel upper and bottom supporting portions and an elastic supporting arm anchor dock, and can prevent the objective lens from incurring an inclined angle.
2. The elastic supporting arm anchor dock can keep the high resonant frequency within a desired range without generating resonance on other elements. Harmful resonance can be prevented from occurring in the high resonant frequency zone, and the stability of the optical pick-up head during reading and writing is enhanced.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. An objective lens holding apparatus for holding an objective lens of an optical system of an optical pick-up head, comprising:

an objective lens holder having an access hole for holding the objective lens;

an elastic supporting arm anchor dock being stationary relative to a vertical focusing direction; and an elastic upper supporting portion and an elastic lower supporting portion, relative to the vertical focusing direction and corresponding to each other and having respectively one end connected to the objective lens holder and another end connected to the elastic supporting arm anchor dock, the upper supporting portion and the lower supporting portion being extendable to cross with each other at a locating beyond the elastic supporting arm anchor dock, wherein the upper supporting portion and the lower supporting portion have respectively a plurality of parallel supporting arms, each of the supporting arms of the upper supporting portion corresponding to one of the supporting arms of the lower supporting portion and the corresponding supporting arms of the upper supporting and the lower supporting portion being extendable to cross with each other at a location beyond the elastic supporting arm anchor dock, and the supporting arm anchor dock including a base seat and an elastic element, the elastic element being located on the base seat on one side and connected to the upper and the lower supporting portion on the opposite side of the elastic element.

2. The objective lens holding apparatus of claim 1, wherein the elastic element is a thin plate.

* * * * *